(12) United States Patent
Newman et al.

(10) Patent No.: US 7,668,299 B2
(45) Date of Patent: Feb. 23, 2010

(54) SYSTEM USING SCRIPT COMMAND TO GENERATE AUDIO QUALITY TEST CASE TO TEST A NETWORK

(75) Inventors: Craig E. Newman, Richardson, TX (US); Geoff Hart, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 493 days.

(21) Appl. No.: 11/611,560

(22) Filed: Dec. 15, 2006

(65) Prior Publication Data

US 2008/0146216 A1    Jun. 19, 2008

(51) Int. Cl.
*H04M 1/24* (2006.01)
(52) U.S. Cl. .................. 379/10.03; 379/10.01
(58) Field of Classification Search ........... 379/1.02; 370/352, 248, 10.03, 10.01; 717/174; 381/56; 709/227
See application file for complete search history.

(56) References Cited

U.S. PATENT DOCUMENTS

| | | | |
|---|---|---|---|
| 2006/0093094 A1* | 5/2006 | Xing et al. ................. | 379/1.02 |
| 2006/0259629 A1* | 11/2006 | Usmani et al. ............. | 709/227 |
| 2006/0280313 A1* | 12/2006 | Schmidmer et al. .......... | 381/56 |
| 2007/0019559 A1* | 1/2007 | Pittelli et al. ................ | 370/248 |
| 2007/0223454 A1* | 9/2007 | Kimura et al. ............. | 370/352 |
| 2007/0240154 A1* | 10/2007 | Gerzymisch et al. ........ | 717/174 |
| 2008/0239971 A1* | 10/2008 | Miyakawa .................. | 370/248 |

\* cited by examiner

*Primary Examiner*—Le Luu

(57) ABSTRACT

A device translates a script command into a test case for testing a network, receives an audio input based on the test case, performs a quality test of the audio based on the test case, and generates a result of the quality test to determine a functionality of the network.

24 Claims, 8 Drawing Sheets

SYSTEM USING SCRIPT COMMAND TO GENERATE AUDIO QUALITY TEST CASE TO TEST A NETWORK

BACKGROUND INFORMATION

A system (e.g., a telecommunications system) may include a variety of communication devices utilizing various protocols and interfaces. Testing the functionality of such a variety of communication devices, protocols, and interfaces may be a daunting task. For example, some communication devices may provide audio or voice signals during normal operation. Testing the quality of such audio or voice signals may typically be a manual and time consuming task.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and methods described herein may permit distributed voice or audio quality testing of a network and/or devices within the network with minimal manual input. The systems and methods may implement the distributed voice quality testing with an interactive testing platform (ITP) system that may test the performance of the network. The ITP system may include a variety of servers, devices, signaling cards, telephony interface cards, etc. that may execute a single test or a batch of tests with or without user interaction.

The ITP system may support a broad range of physical interfaces and signaling protocols. For example, the ITP system may support physical interfaces such as T1, E1, Ethernet, analog loop start lines, DS-3, OC-3, OC-768, etc., and may support signaling protocols such as the International Telecommunication Union (ITU) Signaling System 7 (SS7), integrated services digital network (ISDN), SIP, in-band, H.323, etc.

Figure 1:
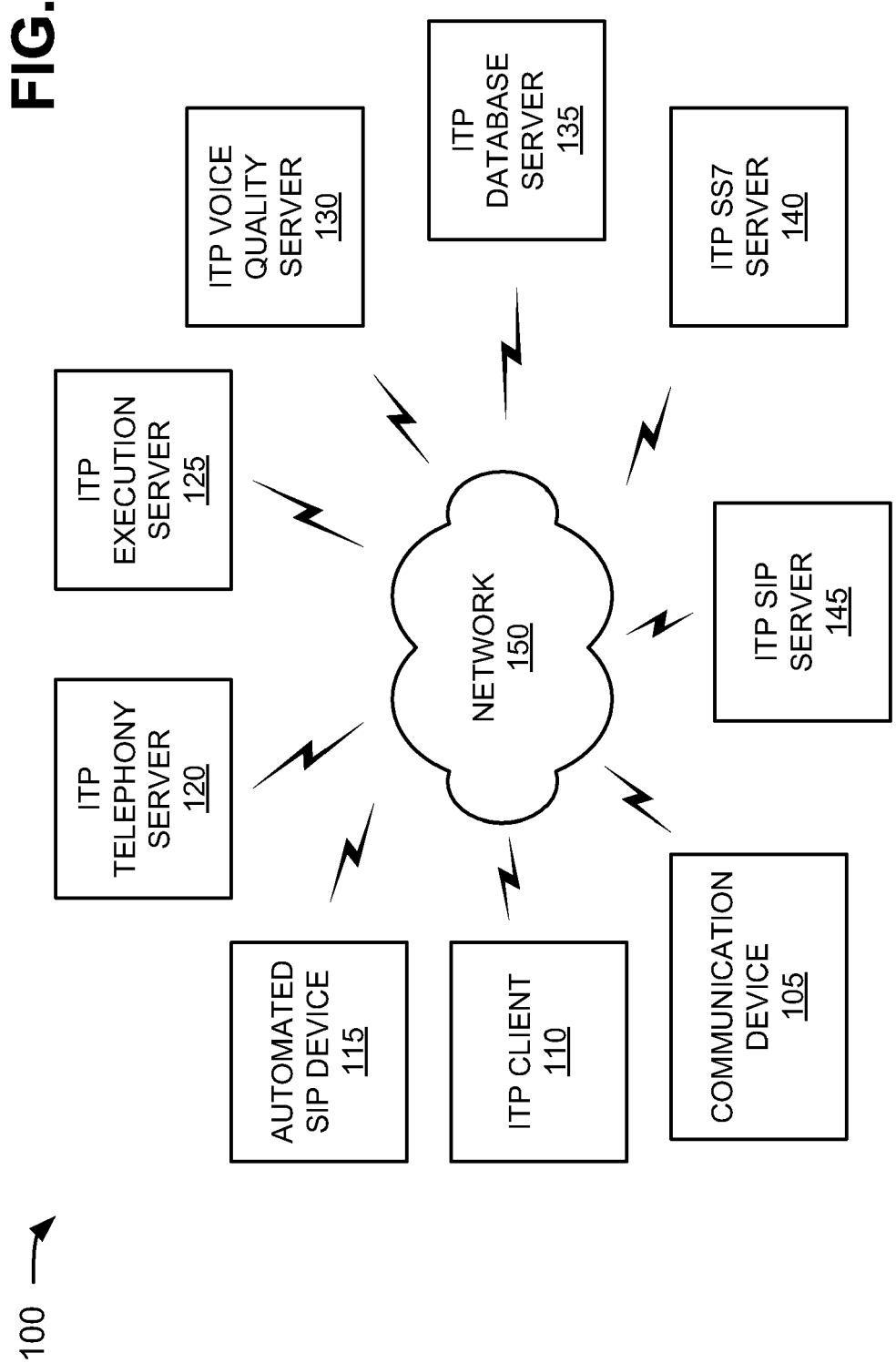
FIG. 1 depicts an exemplary network in which systems and methods described herein may be implemented.

FIG. 1 is a diagram of an exemplary network 100 in which systems and methods described herein may be implemented. Network 100 may include a communication device 105, an ITP client 110, and an automated SIP device (ASD) 115 connected to multiple servers (e.g., an ITP telephony server 120, an ITP execution server 125, an ITP voice quality server 130, an ITP database server 135, an ITP SS7 server 140, and an ITP SIP server 145) via a network 150. Network 150 may include a local area network (LAN), a wide area network (WAN), a telephone network, such as the Public Switched Telephone Network (PSTN), an intranet, the Internet, or a combination of networks.

Communication device 105, ITP client 110, ASD 115, and servers 120-145 may connect to network 150 via wired, wireless, and/or optical connections. One communication device 105, one ITP client 110, one ASD 115, and six servers 120-145 have been illustrated as connected to network 150 for simplicity. In practice, there may be more or fewer communication devices, ITP clients, ASDs, and servers. Also, in some instances, an ITP client may perform one or more functions of a server and/or a server may perform one or more functions of an ITP client.

Communication device 105 may include a device, such as a personal computer, a SIP telephone, a wireless telephone, a personal digital assistant (PDA), a laptop, a device capable of providing audio, an interface device capable of providing audio (e.g., telephone, SIP, H.323, ITU SS7, Realtime Transport Protocol (RTP), T1/E1, DS-3, OC-3, OC-768, and/or analog based line interfaces), or another type of computation or communication device, a thread or process running on one of these devices, and/or an object executable by one of these devices. In one implementation, communication device 105 may include the features set forth in co-pending application Ser. No. 11/611,529, entitled "AUTOMATED TELETYPE (TTY) TESTING," filed on the same date herewith, the disclosure of which is incorporated by reference herein in its entirety.

ITP client 110 may include a client device that may permit testing of network 100 and/or devices connected to network 100 (e.g., communication device 105). A client device may be defined as a device, such as a personal computer, a wireless telephone, a PDA, a laptop, or another type of computation or communication device, a thread or process running on one of these devices, and/or an object executable by one of these devices.

ASD 115 may include a device, such as a personal computer, a telephone, a SIP telephone, a wireless telephone, a personal digital assistant (PDA), a laptop, or another type of computation or communication device, a thread or process running on one of these devices, and/or an object executable by one of these devices. In one implementation, ASD 115 may include the features set forth in co-pending application Ser. No. 11/611,582, entitled "AUTOMATED SESSION INITIATION PROTOCOL (SIP) DEVICE," filed on the same date herewith, the disclosure of which is incorporated by reference herein in its entirety.

ITP telephony server 120 may include server entities that are capable of facilitating testing of telecommunications equipment. ITP telephony server 120 may include physical interface cards (e.g., T1, E1, DS-3, OC-3, OC-768, Ethernet, and/or analog loop-start interface cards) for testing such equipment. In one implementation, ITP telephony server 120 may be provided at various locations of network 100, and application communications may be facilitated via, e.g., a WAN. Such an arrangement may permit a test call to originate in one location (e.g., one city) and terminate in another location (e.g., another city). ITP telephony server 120 may generate and capture audio streams (e.g., tones, dual-tone multi-frequency (DTMF) digits, previously recorded human conversation, etc.).

ITP execution server 125 may include server entities that may permit testing of network 100 and/or devices connected to network 100 (e.g., communication device 105). For example, ITP execution server 125 may provide automated audio streaming to permit near real-time functional testing of audio provided in a network (e.g., network 100) and/or by communication devices within the network. Additional details of ITP execution server 125 are provided below in connection with FIG. 3.

ITP execution server 125 may control tests designed to exercise network devices, such as communication device 105. ITP execution server 125 may communicate with network 150 to perform the tests and may present the resulting information to a user. ITP execution server 125 may permit a user to edit and/or view the executable content of the test cases through a user interface, as well as define and edit scripts for the test cases. The test cases may include a defined purpose and a script that controls execution of the test over network 150. The script, for example, may contain commands to initiate an audio stream over network 150. The script commands may enable construction of messages (e.g., audio streams) and may permit call control that may resemble live network traffic.

ITP execution server 125 (or in cooperation with other ITP servers or other devices, e.g., ITP client 110) may execute script defined for a test case. ITP execution server 125 may perform several operations when it receives a script execution request. ITP execution server 125 may retrieve the script from a database (e.g., ITP database server 135), and may report any problems retrieving the script from the database. ITP execution server 125 may extract data origination and termination resources defined by the test case. ITP execution server 125 may allocate the defined resources, and may also connect to hardware servers using the resource information. The method by which the script uses the applicable resources may affect the resource configuration (e.g., resources used to originate calls may be configured differently from those used to terminate calls). If resources are available to ITP execution server 125 for real-time control, ITP execution server 125 may execute the script and continue until a result has been reached, at which point connections to the hardware servers may be terminated, the allocated resources may be freed, and the test results may be generated by ITP execution server 125. Throughout this process, data elements may be passed from ITP execution server 125 to an ITP client device (e.g., ITP client 110) in order to update the user regarding the tests in progress.

ITP voice quality server 130 may include server entities that may provide voice or audio quality testing of a network and/or devices within the network with minimal manual input. For example, ITP voice quality server 130 may schedule test cases for testing a network and/or network devices, may receive audio inputs based on the scheduled test cases, may analyze the audio inputs based on the scheduled test cases, may generate analysis results, etc. Additional details of ITP voice quality server 130 are provided below in connection with FIG. 4.

ITP database server 135 may include server entities that provide storage of tests designed to exercise network devices, test cases, scripts for the test cases, etc. The test cases may include a defined purpose and a script that controls execution of the test over network 150. The script, for example, may contain commands to initiate an audio stream over network 150. The script commands may enable construction of messages (e.g., audio streams) and may permit call control that may resemble live network traffic. ITP database server 135 may provide a tiered interface to a database used by the ITP system. ITP database server 135 may provide information enabling devices of network 150 to reference specific IP address/port combinations for communication with the specific devices being used.

ITP SS7 server 140 may include server entities that provide interfaces for signal transfer points (STP) to facilitate SS7 signaling methods.

ITP SIP server 145 may include a device that facilitates the establishment of SIP calls and may provide access to Ethernet for SIP processing. A "SIP call," as the term is used herein, is to be broadly interpreted to include any out-of-dialog or dialog-establishing SIP method (e.g., a SIP INVITE request, a SIP SUBSCRIBE request, a SIP REFER request, a SIP OPTIONS request, a SIP MESSAGE request, a SIP REGISTER request, etc.). ITP SIP server 145 may act as both a server and a client for the purpose of making requests on behalf of other clients. Requests may be serviced internally or by passing them on, possibly after translation, to other servers. ITP SIP server 145 may interpret, and, if necessary, rewrite a request message before forwarding it.

Although FIG. 1 shows exemplary components of network 100, in other implementations, network 100 may contain fewer or additional components that may permit network testing. In still other implementations, one or more components of network 100 may perform the tasks performed by other components of network 100.

While servers 120-145 are shown as separate entities, it may be possible for one or more of servers 120-145 to perform one or more of the functions of another one or more of servers 120-145. For example, it may be possible that two or more of servers 120-145 are implemented as a single server. It may also be possible for a single one of servers 120-145 to be implemented as two or more separate (and possibly distributed) devices.

Although implementations are described below in the context of a network that supports devices capable of producing audio, in other implementations, equivalent or analogous communication protocols and/or types of transport networks (e.g., asynchronous transfer mode (ATM), frame relay, etc.) may be used. Both the ITU H.323 standard and the IETF's SIP are examples of protocols that may be used for establishing a communications session among terminals, such as communication device 110, connected to a network. Although audio based protocols are shown for convenience, any type of protocol or a mixture of such protocols may be applied in various parts of the overall system.

Figure 2:
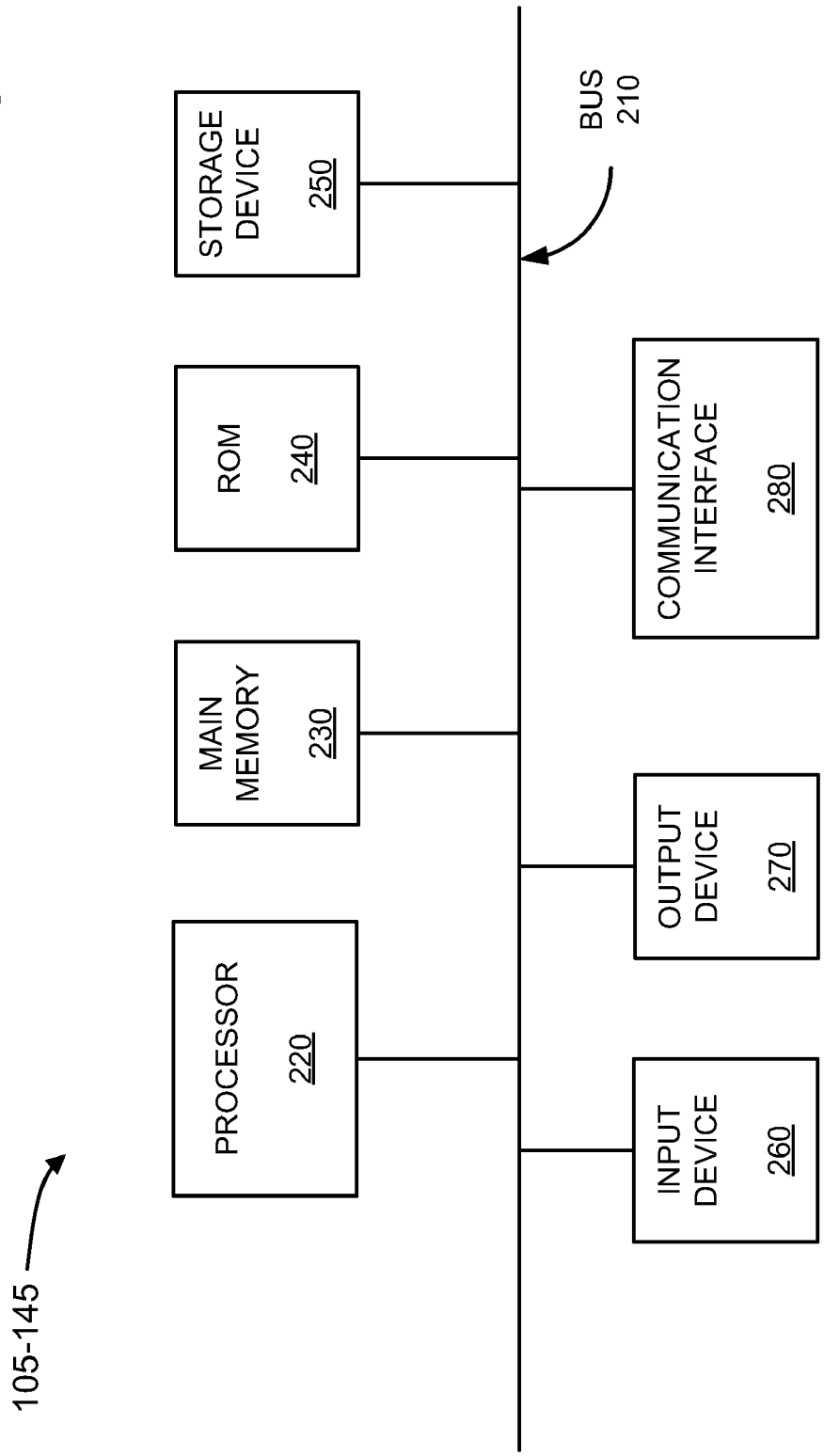
FIG. 2 depicts an exemplary device, client or server, configured to communicate via the exemplary network of FIG. 1.

FIG. 2 is an exemplary diagram of a client or server entity (hereinafter called "client/server entity"), which may correspond to one or more of communication device 105, ITP client 110, ASD 115, and servers 120-145. The client/server entity may include a bus 210, a processor 220, a main memory 230, a read only memory (ROM) 240, a storage device 250, an input device 260, an output device 270, and a communication interface 280. Bus 210 may include a path that permits communication among the elements of the client/server entity.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information into the client/server entity, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

As will be described in detail below, the client/server entity may perform certain operations. The client/server entity may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of the client/server entity, in other implementations, the client/server entity may contain fewer or additional components. In still other implementations, one or more components of the client/server entity may perform the tasks performed by other components of the client/server entity.

Figure 3:
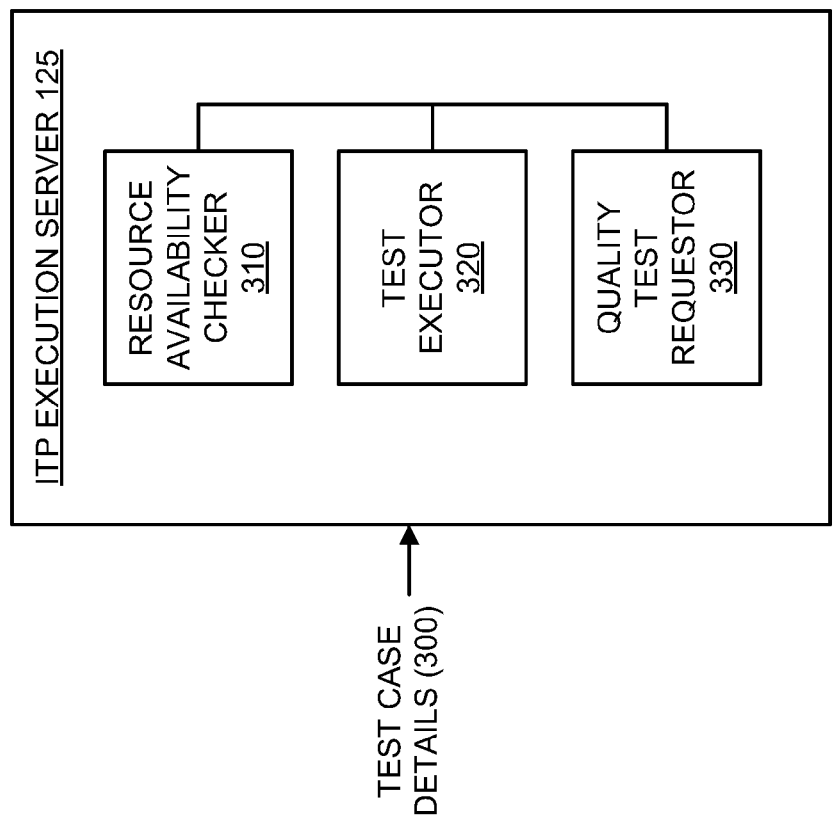
FIG. 3 is an exemplary functional diagram of an interactive testing platform (ITP) execution server of the exemplary network shown in FIG. 1.

FIG. 3 is an exemplary functional diagram of ITP execution server 125 of exemplary network 100. As shown, ITP execution server 125 may include a variety of components, including, e.g., a resource availability checker 310, a test executor 320, a quality test requester 330, etc. ITP execution server 125 may receive test case details 300 from a database, e.g., ITP database server 135. Test case details 300 may include a defined purpose and a script that controls execution of the test over network 150. The script, for example, may contain commands to initiate an audio stream over network 150. The script commands may enable construction of messages (e.g., audio streams) and may permit call control that may resemble live network traffic. If a user instructs the ITP system to execute a test, test case details 300 may be retrieved from ITP database server 135, and the request to execute the test may be passed to ITP execution server 125.

Resource availability checker 310 may perform a variety of tasks. For example, resource availability checker 310 may determine the availability of the network originating and terminating points defined by the test. If the resources (e.g., the network originating and terminating points) are available, ITP execution server 125 may begin performance of the test. If the resources are not available, resource availability checker 310 may place the test in a queue until the resources become available.

Test executor 320 may communicate test information to the network (e.g., network 150) and/or devices of the network (e.g., communication device 105) to synchronize a test event(s). For example, test executor 320 may instruct an originating device of the network to generate audio and may instruct a terminating device of the network to receive and store the generated audio. Test executor 320 may communicate with the originating and terminating devices to facilitate completion of a voice quality test. For example, test executor 320 may instruct an originating ITP telephony server to play a prerecorded audio stream containing a human voice, and may instruct a terminating ITP telephony server to record the audio stream. If the entire audio file has been streamed, test executor 320 may instruct the ITP telephony servers to release the call using appropriate signaling methods.

Quality test requester 330 may request ITP voice quality server 130 to conduct a voice quality test. For example, quality test requestor 330 may provide reference to the audio file streamed by the originating ITP telephony server, and may provide reference to the audio stream recorded on the terminating ITP telephony server. The streamed audio file and the recorded audio stream may be provided across network 150 as a data file (e.g., using an error correction protocol such as TCP/FTP) to ITP voice quality server 130.

ITP execution server 125 may provide a distributed system for testing a large number of network devices and/or interfaces simultaneously or substantially simultaneously. Thus, a large number of ITP system users may work on a variety of diverse test cases for a network simultaneously. ITP execution server 125 may perform a variety of test cases in parallel, and the results of the various tests may be serially processed by ITP voice quality server 130. In one implementation, ITP execution server 125 may include the testing features set forth in co-pending application Ser. No. 11/611,605, entitled "AUTOMATED AUDIO STREAM TESTING," filed on the same date herewith, the disclosure of which is incorporated by reference herein in its entirety.

Although FIG. 3 shows exemplary components of ITP execution server 125, in other implementations, ITP execution server 125 may contain fewer or additional components that may permit network testing by ITP execution server 125. In still other implementations, one or more components of ITP execution server 125 may perform the tasks performed by other components of ITP execution server 125.

Figure 4:
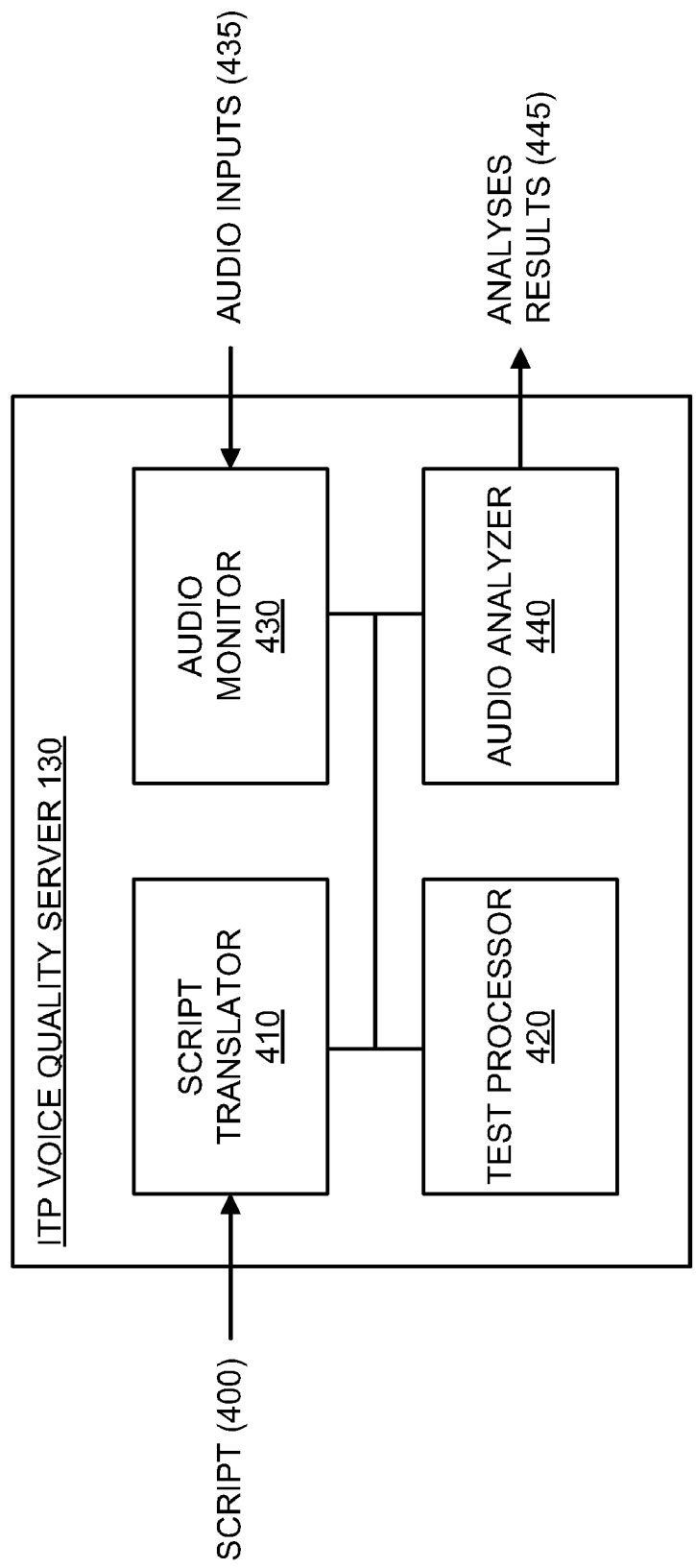
FIG. 4 is an exemplary functional diagram of an ITP voice quality server of the exemplary network shown in FIG. 1.

An ITP system may include several servers that may interoperate in the execution of testing a network (e.g., ITP telephony server 120, ITP execution server 125, ITP database server 135, ITP SS7 server 140, ITP SIP server 145, etc.). FIG. 4 is an exemplary functional diagram of one such server, i.e., ITP voice quality server 130 of exemplary network 100. Generally, ITP voice quality server 130 may translate script commands (e.g., Visual Basic style script commands) into test cases for a network, may schedule test cases for testing the network, may receive audio inputs based on the scheduled test cases, may analyze the audio inputs, and/or may generate analyses results to determine network functionality. As shown, ITP voice quality server 130 may include a variety of components. For example, ITP voice quality server 130 may include a script translator 410, a test processor 420, an audio monitor 430, an audio analyzer 440, etc.

Script translator 410 may receive a script command(s) 400 from the ITP system, and may translate script command(s) 400 into test cases for a network. Script command(s) 400 may include commands for the creation of test cases for the network, e.g., network 100. Script command(s) 400 may also define which physical devices of the network may be used. Script translator 410 may utilize ITP database server 135 to aid in the translation of script command(s) 400. An ITP system user may create new script command(s) 400 (i.e., a new test) or may retrieve previously created script command(s) 400 (i.e., a saved test). In one example, script command(s) 400 may define call originating and terminating devices of network 150, may define signaling protocols for the originating and terminating devices, and/or may specify telephone numbers for the originating and terminating devices.

Test processor 420 may schedule test cases for devices and/or interfaces of a network (e.g., network 150) based on the translated script command(s) 400. For example, test processor 420 may schedule a test case that includes a call originating device of network 150 and a call terminating device of network 150, based on script command(s) 400. Test processor 420 may also utilize script command(s) 400 to define signaling protocols for the originating and terminating devices, and/or to specify telephone numbers for the originating and terminating devices.

Audio monitor 430 may monitor for and/or receive audio input(s) 435 from devices of network 150 defined by a test case(s). For example, audio monitor 430 may receive an audio file streamed by a call originating device of network 150, and may receive an audio stream recorded on a terminating device of network 150. In other implementations, the audio files may be transported across network 150 from the originating and terminating devices using an error correcting protocol such as TCP/FTP.

Audio analyzer 440 may analyze audio input(s) 435 using a methodology or methodologies defined by a test case(s). For example, audio analyzer 440 may perform a perceptual speech quality measure (PSQM), a perceptual evaluation of speech quality (PESQ), a perceptual evaluation of audio quality (PEAQ), and/or perceptual evaluation of video quality (PEVQ) calculations on audio input(s) 435. In another example, audio analyzer 440 may calculate a mean opinion score (MOS), which may represent a perceived quality of two audio input(s) 435, e.g., a first audio input representing the original audio content, and a second audio input representing the recorded audio content. In one implementation, logic within script command(s) 400 may determine the overall test result. For example, script command(s) 400 may specify that if the MOS is less than a predetermined number (e.g., "3.5"), the overall test result may be determined a failure.

Audio analyzer 440 may also generate analyses result(s) 445 to determine the functionality of a network. For example, audio analyzer 440 may provide analyses result(s) 445 (e.g., PSQM, PESQ, PEAQ, PEVQ, and/or MOS results) to ITP execution server 125 and/or ITP database server 135, e.g., as part of the overall test result, and/or may provide analyses result(s) 445 to ITP client 110 where they may be displayed, e.g., in a detailed or a summary manner.

Although FIG. 4 shows exemplary components of ITP voice quality server 130, in other implementations, ITP voice quality server 130 may contain fewer or additional components that may permit testing of network 150 and/or devices of network 150. In still other implementations, one or more components of ITP voice quality server 130 may perform the tasks performed by other components of ITP voice quality server 130. For example, while ITP voice quality server 130 is shown receiving audio inputs 435, in other implementations, ITP voice server 130 may additionally or alternatively receive video inputs. ITP server 130 may perform quality tests on the video inputs, such as PEVQ calculation.

Figure 5:
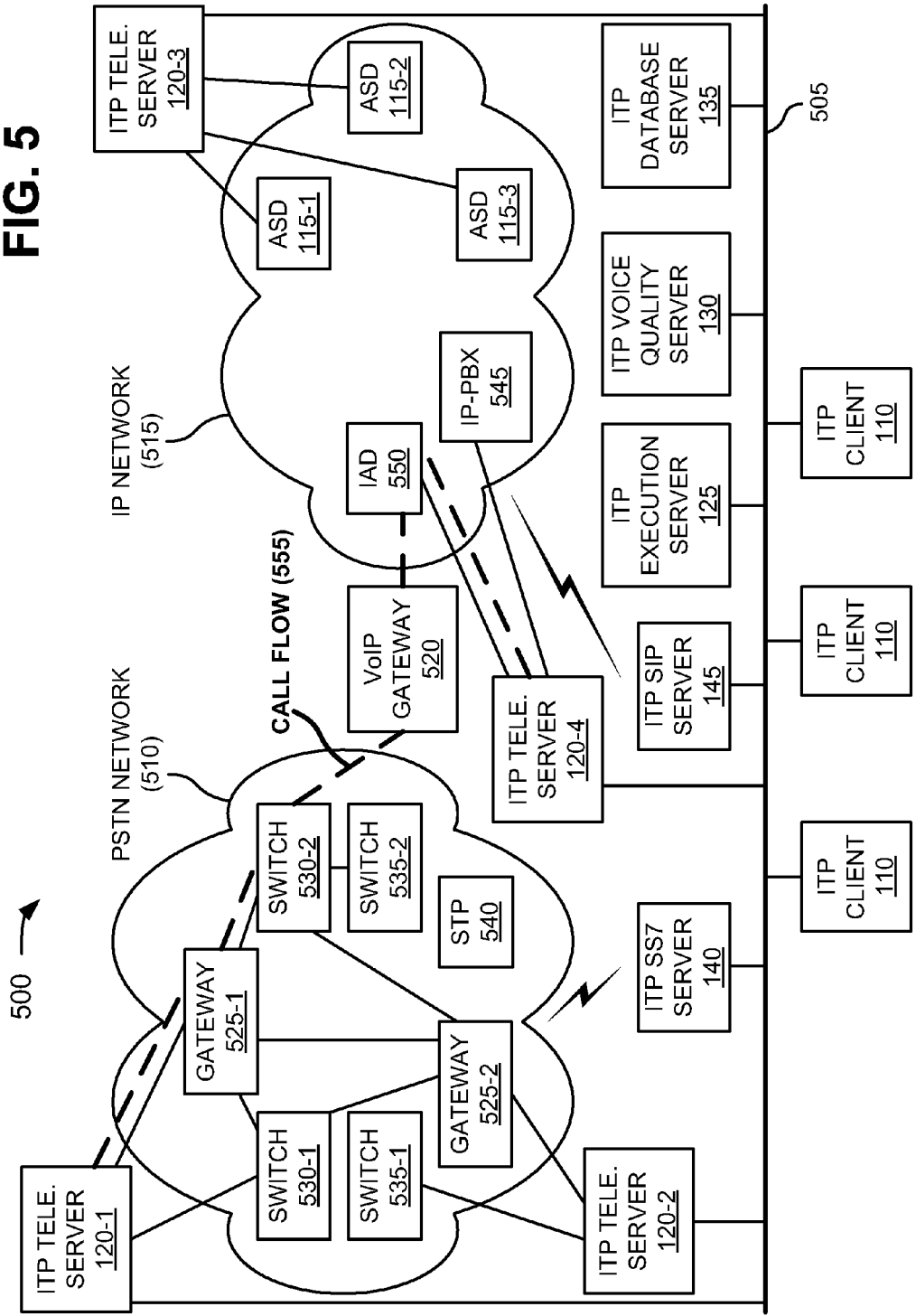
FIG. 5 depicts another exemplary network in which systems and methods described herein may be implemented.

FIG. 5 depicts an exemplary network 500 in which systems and methods described herein may be implemented. As shown, network 500 may include one or more ITP clients 110 connected to ITP system servers (e.g., one or more ITP telephony servers 120-1, . . . , 120-4, ITP execution server 125, ITP voice quality server 130, ITP database server 135, ITP SS7 server 140, and/or ITP SIP server 145) via a LAN or a WAN 505. As further shown, an exemplary PSTN network 510 may connect to an exemplary IP network 515 via a voice over Internet protocol (VoIP) gateway 520. ITP clients 110 and the ITP system servers may connect to PSTN network 510 and IP network 515 via wired, wireless, and/or optical connections.

PSTN network 510 may include a variety of components, such as gateways 525-1 and 525-2 (collectively referred to as "gateways 525"), class three switches 530-1 and 530-2 (collectively referred to as "switches 530"), class five switches 535-1 and 535-2 (collectively referred to as "switches 535"), a signal transfer points (STP) device 540, etc.

Gateways 525 and switches 530/535 may include data transfer devices or some other types of devices that process and/or transfer data. In one implementation, gateways 525 and switches 530/535 may operate on data on behalf of a network, such as PSTN network 510. For example, gateways 525 and switches 530/535 may receive all, or substantially all, data destined for PSTN network 510 and/or transmitted by PSTN network 510.

STP device 540 may include a device or a switch that relays SS7 messages between service switching points (SSPs) and service control points (SCPs). Based on address fields of SS7 messages, STP device 540 may route the messages to an appropriate outgoing signaling link. In one implementation, STP device 540 may operate on data on behalf of a network, such as PSTN network 510. For example, STP device 540 may receive all, or substantially all, data destined for PSTN network 510 and/or transmitted by PSTN network 510.

IP network 515 may include a variety of components, such as ASDs 115-1, 115-2, and 115-3 (collectively referred to as "ASDs 115"), an IP private branch exchange (IP-PBX) device 545, an integrated access device (IAD) 550, etc. ASDs 115 may include the features described above in connection with FIG. 1.

IP-PBX device 545 may include a data transfer device or some other type of device that processes and/or transfers data. In one implementation, IP-PBX device 545 may include a device that switches calls between VoIP users on local lines while allowing users to share a predetermined number of external phone lines or a SIP trunk. IP-PBX device 545 can also switch calls between a VoIP user and a traditional telephone user, or between two traditional telephone users. In another implementation, IP-PBX device 545 may employ converged data and voice networks (i.e., Internet access, as well as VoIP communications and traditional telephone communications, may be possible using a single line to each user). Various compression/decompression algorithms (CODECS) such as G.729 may provide greater compression than traditional PBX devices.

IAD 550 may include a device that can deliver switch voice services, packet voice services, and data services, e.g., over a single network link. IAD 550 may provide a common platform that enables service providers to deliver voice and data over a single access network, reducing the cost of co-located equipment and allowing service providers to lease fewer transport spans. In one implementation, IAD 550 may convert a RTP protocol call into a pulse code modulation (PCM) call for termination at a network device (e.g., ITP telephony server 120-4).

As further shown in FIG. 5, a call flow 555 may be provided in an exemplary test. A user may initiate the exemplary test using, e.g., one of ITP clients 110. The exemplary test may be newly created by the user or retrieved from a database such as ITP database server 135. The test shown in FIG. 5, for example, may specify gateway 525-1 as a call origination point, IAD 550 as a call termination point, a trunk(s) to be used, a port(s) to be used, etc. In FIG. 5, the ITP system may include ITP clients 110, ITP telephony servers 120, ITP execution server 125, ITP voice quality server 130, ITP database server 135, ITP SS7 server 140, and ITP SIP server 145. The remaining devices of FIG. 5 may constitute the network being tested.

A script (e.g., script command(s) 400) may define the physical devices, routing, protocols, etc. of network 500 to be used for conducting the test. For example, the script may define gateway 525-1 as the call origination point, and may define IAD 550 as the call termination point. A database within the ITP system (e.g., ITP database server 135) may enable the ITP system to reference specific IP address/port combinations to communicate with the specific network devices being used. For this example, it may be assumed that the test case (e.g., script command(s) 400) specifies SS7 as a signaling protocol for origination and primary rate interface (PRI) as a signaling protocol for termination. The test case may also specify the originating and terminating telephone numbers. Routing information preconfigured in PSTN network 510 and IP network 515 may ensure that if a telephone number is dialed on the originating device (e.g., gateway 525-1), network 500 may pass call flow 555 to switch 530-2, VoIP gateway 520, and on to IAD 550 for termination.

If the user instructs the ITP system to execute the exemplary test, ITP execution server 125 may retrieve the test details from ITP database server 135, and may request execution of the exemplary test. ITP execution server 125 may determine if the specified originating and terminating points defined by the test case are available. If the specified originating and terminating points are not available, ITP execution server 125 may place the test in queue until the network resources become available.

ITP execution server 125 may communicate information related to the exemplary test to, e.g., ITP telephony servers 120-1 and 120-4, in order to synchronize the test. ITP telephony server 120-1 may utilize SS7 signaling to communicate with gateway 525-1. Signaling information may inform gateway 525-1 of the telephone number to be called. The routing of network 500 may instruct the call through VoIP gateway 520 where the call protocol may change from PCM to RTP. In one implementation, the call may be passed through devices (not shown) of IP network 515 that may impair the call for the purpose of the test. The call may be routed to IAD 550, and IAD 550 may convert the RTP protocol back to PCM protocol. The call may be terminated at ITP telephony server 120-4 using ISDN protocol.

ITP execution server 125 may communicate with ITP telephony servers 120-1 and 120-4 to facilitate completion of a voice quality test. For example, ITP execution server 125 may instruct ITP telephony server 120-1 to play a prerecorded audio stream containing a human voice, and may instruct ITP telephony server 120-4 to record the incoming audio stream. If the entire audio has been streamed, ITP execution server 125 may instruct ITP telephony servers 120-1 and 120-4 to release the call using appropriate SS7 and PRI signaling methods.

ITP execution server 125 may request ITP voice quality server 130 to conduct a voice quality test. ITP execution server 125 may provide ITP voice quality server 130 with references to the original audio stream provided by ITP telephony server 120-1 and the audio stream recorded by ITP telephony server 120-4. The original audio stream provided by ITP telephony server 120-1 and the audio stream recorded by ITP telephony server 120-4 may be transferred to ITP voice quality server 130.

ITP voice quality server 130 may perform a voice quality test(s) (e.g., PSQM, PESQ, PEAQ, PEVQ, and/or MOS calculations) on the received audio inputs (i.e., the original and recorded audio streams). For example, ITP voice quality server 130 may compare the received audio inputs and may calculate the MOS, which may represent a perceived quality of the audio inputs. Logic within script command(s) 400 may determine the overall test result. For example, script command(s) 400 may specify that if the MOS is less than a predetermined number (e.g., "3.5"), the overall test result may be determined a failure. ITP voice quality server 130 may also generate analyses result(s) to determine the functionality of network 500. For example, ITP voice quality server 130 may provide analyses result(s) (e.g., PSQM, PESQ, PEAQ, PEVQ, and/or MOS results) to ITP execution server 125 and/or ITP database server 135, e.g., as part of the overall test result, and/or may provide analyses result(s) to ITP client 110 where they may be displayed, e.g., in a detailed or a summary manner.

Although FIG. 5 shows one exemplary test performed by the ITP system, in other implementations, additional or different tests may be performed by the ITP system. For example, the ITP system may be used to verify tones and/or levels in both directions between originating and terminating devices. In another example, the ITP system may provide interfaces to a network (e.g., network 150) using protocols such as in-band, ISDN, SIP, H.323, and SS7. The ITP system may support testing from an ASD to or from such protocols. In still another example, the ITP system may support SIP testing directly from IP resources on an IP network. Rather than using an actual SIP phone, the ITP system may emulate SIP messaging and an RTP voice path. This may make it possible to create tests where the protocol may be non-conforming or corrupt. Such testing may help determine systems error trapping abilities. In a further example, ASDs 115 may originate and/or terminate SIP based calls directly to a SIP server (e.g., ITP SIP server 145).

Although FIG. 5 shows exemplary components of network 500, in other implementations, network 500 may contain fewer or additional components that may permit network testing. In still other implementations, one or more components of network 500 may perform the tasks performed by other components of network 500.

Figure 6:
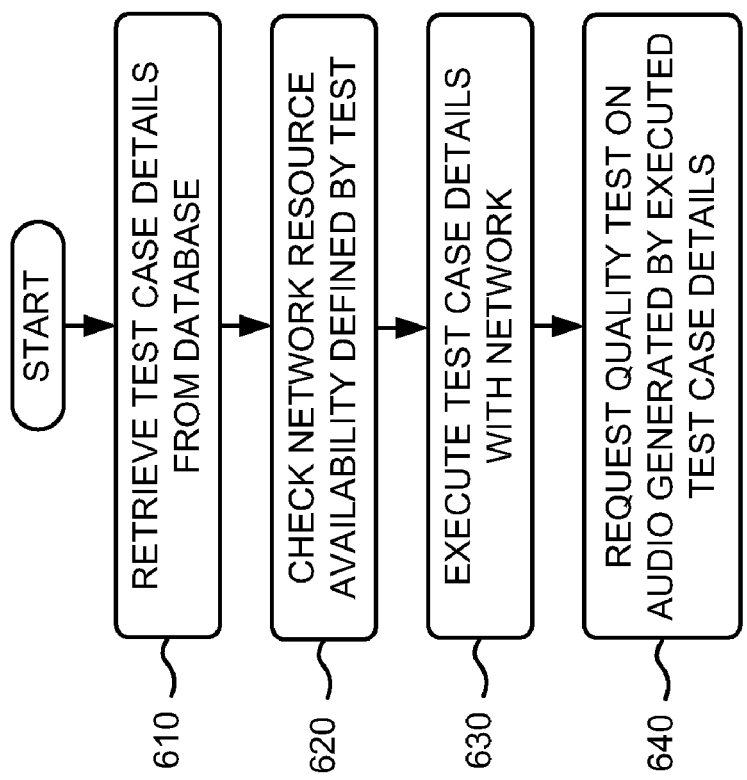
FIG. 6 is a flowchart of an exemplary process capable of being performed by the ITP execution server shown in FIG. 3.

FIG. 6 is a flowchart of an exemplary process capable of being performed by the ITP execution server 125. As shown, process 600 may receive test case details for testing a network from a database (block 610). For example, in one implementation described above in connection with FIG. 3, ITP execution server 125 may receive test case details 300 from a database, e.g., ITP database server 135. Test case details 300 may include a defined purpose and a script that controls execution of the test over network 150. The script, for example, may contain commands to initiate an audio stream over network 150. The script commands may enable construction of messages (e.g., audio streams) and may permit call control (e.g., signaling) that may resemble live network traffic. If a user instructs the ITP system to execute a test, test case details 300 may be retrieved from ITP database server 135, and the request to execute the test may be passed to ITP execution server 125.

Process 600 may check the availability of network resources defined by the test case details (block 620). For example, in one implementation described above in connection with FIG. 3, resource availability checker 310 of ITP execution server 125 may determine the availability of the network originating and terminating points defined by the test. If the resources (e.g., the network originating and terminating points) are available, ITP execution server 125 may begin performance of the test. If the resources are not available, resource availability checker 310 may place the test in a queue until the resources become available.

As further shown in FIG. 6, process 600 may execute the test case details with the defined network resources (block 630). For example, in one implementation described above in connection with FIG. 3, test executor 320 of ITP execution server 125 may communicate test information to the network (e.g., network 150) and/or devices of the network to synchronize a test event(s). Test executor 320 may instruct an originating device of the network to generate audio and may instruct a terminating device of the network to receive and store the generated audio. Test executor 320 may communicate with the originating and terminating devices to facilitate completion of a voice quality test. If the entire audio file has been streamed, test executor 320 may instruct the call to be released using appropriate signaling methods.

Process 600 may request a quality test of audio generated by the executed test case details (block 640). For example, in one implementation described above in connection with FIG. 3, quality test requester 330 of ITP execution server 125 may request ITP voice quality server 130 to conduct a voice quality test. Quality test requester 330 may provide reference to the audio file streamed by the originating network device, and may provide reference to the audio stream recorded on the terminating network device. The streamed audio file and the recorded audio stream may be provided across network 150 to ITP voice quality server 130, e.g., using an error correcting protocol such as TCP/FTP.

Figure 7:
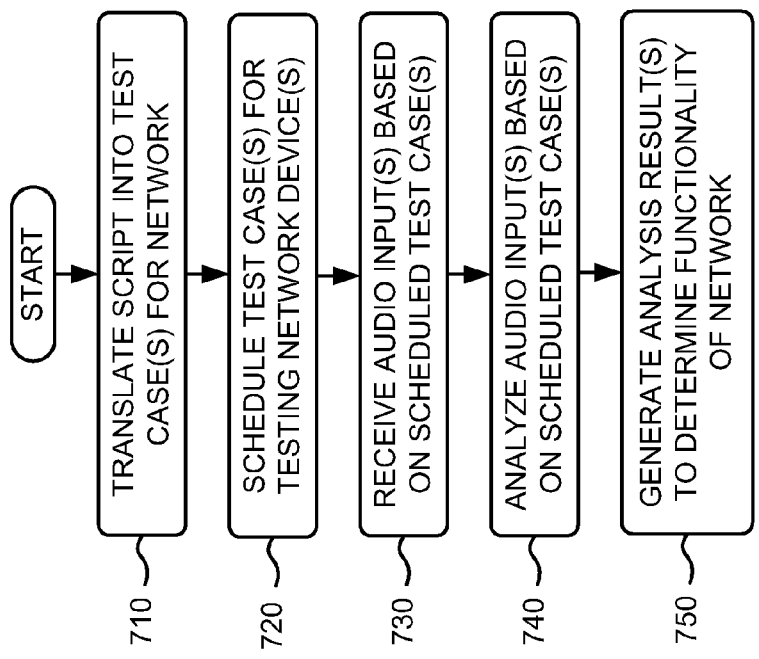
FIG. 7 is a flowchart of an exemplary process capable of being performed by the ITP voice quality server shown in FIG. 4.

FIG. 7 is a flowchart of an exemplary process 700 capable of being performed by ITP voice quality server 130. As shown, process 700 may translate script into test case(s) for a network (block 710). For example, in one implementation described above in connection with FIG. 4, script translator 410 of ITP voice quality server 130 may receive script command(s) 400 from the ITP system, and may translate script command(s) 400 into test cases for a network. Script command(s) 400 may define which physical devices of the network may be used. In one example, script command(s) 400 may define call originating and terminating devices of network 150, may define signaling protocols for the originating and terminating devices, and/or may specify various attributes (e.g., telephone numbers, calling party, called party, etc.) for the originating and terminating devices.

As further shown in FIG. 7, process 700 may schedule the test case(s) for testing network device(s) (block 720). For example, in one implementation described above in connection with FIG. 4, test processor 420 of ITP voice quality server 130 may schedule test cases for devices and/or interfaces of a network (e.g., network 150) based on the translated script command(s) 400. In one example, test processor 420 may schedule a test case that includes a call originating device of network 150 and a call terminating device of network 150, based on script command(s) 400. Test processor 420 may also utilize script command(s) 400 to define signaling protocols for the originating and terminating devices, and/or to specify telephone numbers or other attributes for the originating and terminating devices.

Process 700 may receive an audio input(s) based on the scheduled test case(s) (block 730). For example, in one implementation described above in connection with FIG. 4, audio monitor 430 of ITP voice quality server 130 may monitor for audio input(s) 435 from devices of network 150 defined by a test case(s). For example, audio monitor 430 may receive an audio file streamed by a call originating device of network 150, and may receive an audio stream recorded on a terminating device of network 150. In other implementations, the audio files may be transported across network 150 using an error correcting protocol such as TCP/FTP.

As further shown in FIG. 7, process 700 may analyze the audio input(s) based on the scheduled test case(s) (block 740). For example, in one implementation described above in connection with FIG. 4, audio analyzer 440 of ITP voice quality server 130 may analyze audio input(s) 435 using a methodology or methodologies defined by a test case(s). In one example, audio analyzer 440 may perform PSQM, PESQ, PEAQ, and/or PEVQ calculations on audio input(s) 435. In another example, audio analyzer 440 may calculate a MOS, which may represent a perceived quality of two audio input(s) 435, e.g., a first audio input representing the original audio content, and a second audio input representing the recorded audio content.

Process 700 may generate an analysis result(s) to determine the functionality of the network (block 750). For example, in one implementation described above in connection with FIG. 4, audio analyzer 440 of ITP voice quality server 130 may generate analyses result(s) 445 to determine the functionality of a network. In one example, audio analyzer 440 may provide analyses result(s) 445 (e.g., PSQM, PESQ, PEAQ, PEVQ, and/or MOS results) to ITP execution server 125 and/or ITP database server 135, e.g., as part of the overall test result, and/or may provide analyses result(s) 445 to ITP client 110 where they may be displayed, e.g., in a detailed or a summary manner.

Figure 8:
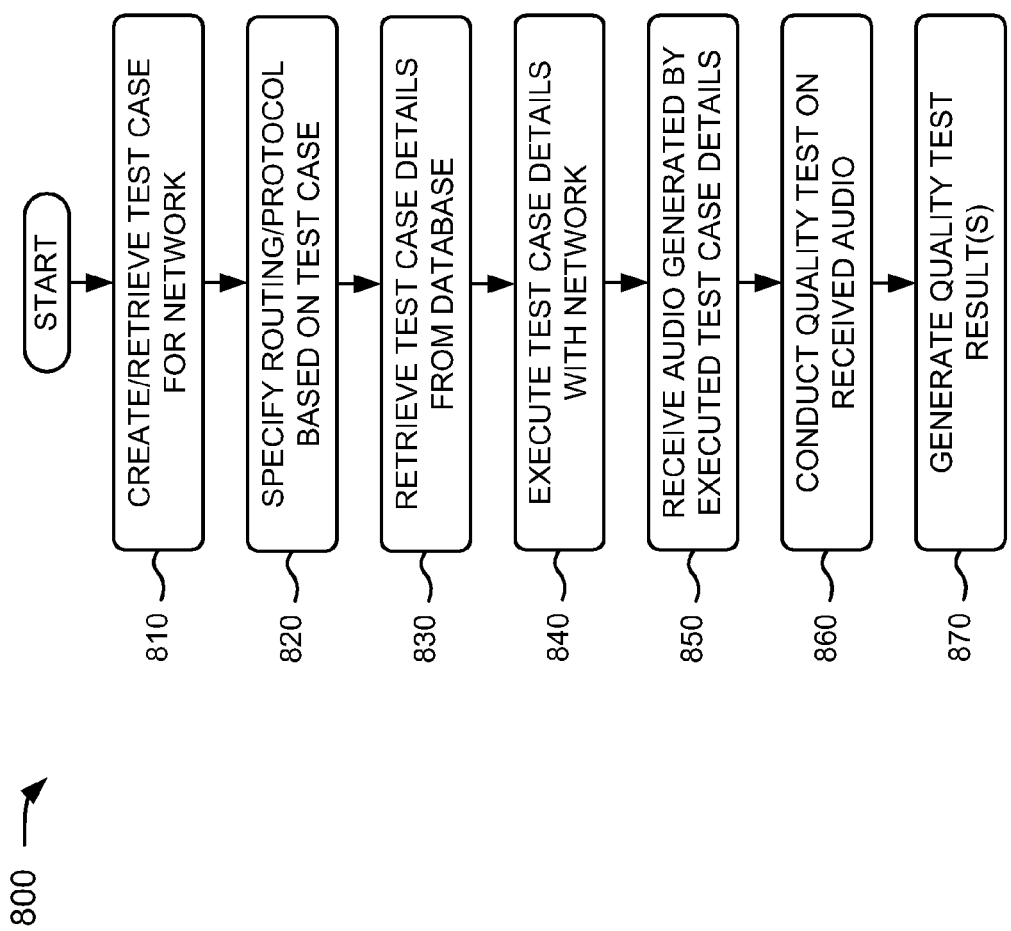
FIG. 8 is a flowchart of an exemplary process capable of being performed by the ITP execution server shown in FIG. 3 and/or by the ITP voice quality server shown in FIG. 4.

FIG. 8 is a flowchart of an exemplary process capable of being performed by the ITP execution server 125 and/or ITP voice quality server 130. As shown, process 800 may create and/or retrieve a test case for a network (block 810). For example, in one implementation described above in connection with FIG. 5, a user may initiate the exemplary test using, e.g., one of ITP clients 110 or ITP execution server 125. The exemplary test may be newly created by the user or retrieved from a database such as ITP database server 135.

As further shown in FIG. 8, process 800 may specify network routing and/or a protocol based on the test case (block 820). For example, in one implementation described above in connection with FIG. 5, a script (e.g., script command(s) 400) may define the physical devices, routing, protocols, etc. of network 500 to be used for conducting the test. A database within the ITP system (e.g., ITP database server 135) may enable the ITP system to reference specific IP address/port combinations to communicate with the specific network devices being used. The test case may also specify the originating and terminating telephone numbers, as well as other signaling protocol attributes.

Process 800 may retrieve test case details from a database (block 830). For example, in one implementation described above in connection with FIG. 5, if the user instructs the ITP system to execute the exemplary test, ITP execution server 125 may retrieve the test details from ITP database server 135, and may request execution of the exemplary test. ITP execution server 125 may determine if the specified originating and terminating points defined by the test case are available. If the specified originating and terminating points are not available, ITP execution server 125 may place the test in queue until the network resources become available.

As further shown in FIG. 8, process 800 may execute the test case details with the network (block 840). For example, in one implementation described above in connection with FIG. 5, ITP execution server 125 may communicate information related to the exemplary test to, e.g., ITP telephony servers 120-1 and 120-4, in order to synchronize the test and to execute the test case details in the network.

Process 800 may receive audio generated by the executed test case details in the network (block 850). For example, in one implementation described above in connection with FIG. 5, ITP execution server 125 may request ITP voice quality server 130 to conduct a voice quality test. ITP execution server 125 may provide ITP voice quality server 130 with references to the original audio stream and the recorded audio stream. The original audio stream and the recorded audio stream may be transferred to and received by ITP voice quality server 130, e.g., using error correcting protocols such as TCP/FTP.

As further shown in FIG. 8, process 800 may conduct a quality test of the received audio (block 860). For example, in one implementation described above in connection with FIG. 5, ITP voice quality server 130 may perform a voice quality test(s) (e.g., PSQM, PESQ, PEAQ, PEVQ, and/or MOS calculations) on the received audio inputs (i.e., the original and recorded audio streams). In one example, ITP voice quality server 130 may compare the received audio inputs and may calculate the MOS, which may represent a perceived quality of the audio inputs.

Process 800 may generate a quality test result(s) (block 870). For example, in one implementation described above in connection with FIG. 5, ITP voice quality server 130 may generate analyses result(s) to determine the functionality of network 500. In one example, ITP voice quality server 130 may provide analyses result(s) (e.g., PSQM, PESQ, PEAQ, PEVQ, and/or MOS results) to ITP execution server 125 and/or ITP database server 135, e.g., as part of the overall test result, and/or may provide analyses result(s) to ITP client 110 where they may be displayed, e.g., in a detailed or a summary manner.

Systems and methods described herein may permit distributed voice or audio quality testing of a network and/or devices within the network with minimal manual input. The systems and methods may implement the distributed voice quality testing with an ITP system that may test the performance of the network. The ITP system may include a variety of servers, devices, signaling cards, telephony interface cards, etc. that may execute a single test or a batch of tests with or without user interaction.

The foregoing description provides illustration and description, but is not intended to be exhaustive or to limit the embodiments to the precise form disclosed. Modifications and variations are possible in light of the above teachings or may be acquired from practice of the invention.

For example, while series of acts have been described with regard to the flowcharts of FIGS. 6-8, the order of the acts may differ in other implementations consistent with the embodiments described herein. Further, non-dependent acts may be performed in parallel.

Embodiments, as described above, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method comprising:
   retrieving, by the computing device, a test case for testing a network;
   checking, by the computing device, an availability of an originating device and a terminating device of the network defined by the test case, where the originating and terminating devices are distinct from the computing device and from each other;
   executing, by the computing device, the test case over the network and via the originating and terminating devices, where executing the test case includes:
   instructing the originating device to generate audio,
   instructing the terminating device to receive and store the audio via the network,
   instructing the originating device to release the audio generated by the originating device for a quality test; and
   requesting, by the computing device, the quality test based on the audio generated by the originating device and the audio stored on the terminating device.

2. The method of claim 1, where the test case includes a script that controls execution of the test case over the network.

3. The method of claim 1, where the script includes a command to initiate an audio stream over the network.

4. The method of claim 1, where, when at least one of the originating device or the terminating device is unavailable, the method further comprises:
   placing the test case in a queue until the at least one of the originating device or the terminating device becomes available.

5. The method of claim 1, where executing the test case over the network further comprises:
   communicating test information to the network to synchronize a test event.

6. The method of claim 1, where requesting the quality test based on the audio generated by the originating device and the audio stored on the terminating device comprises:
   providing reference to the audio generated by the originating device;
   providing reference to the audio stored on the terminating device; and
   transferring the referenced audio across the network to preserve a quality of the referenced audio.

7. The method of claim 1, where the quality test includes a voice quality test.

8. A device comprising:
   a resource availability checker to check an availability of an originating device and a terminating device of a network to be tested based on a test case, where the originating and terminating devices are distinct from the device and from each other;
   a test executor to execute the test case over the network and via the originating and terminating devices, where the test executor is further to:
   instruct the originating device to generate audio,
   instruct the terminating device to receive and store the audio,
   instruct the originating device to release the audio generated by the originating device for a quality test, and
   instruct the terminating device to release the audio stored on the terminating device to be released for the quality test; and
   a quality test requestor to request the quality test based on the audio generated by the originating device and the audio stored on the terminating device.

9. The device of claim 8, where, when at least one of the originating device or the terminating device is unavailable, the resource availability checker is further to place the test case in a queue until the at least one of the originating device or the terminating device becomes available.

10. The device of claim 8, wherein the test executor is further to:

communicate test information to the network to synchronize a test event.

11. The device of claim 10, where the quality test requestor is further to:
provide reference to the audio generated by the originating device;
provide reference to the audio stored on the terminating device; and
transfer the referenced audio across the network to preserve a quality of the referenced audio.

12. A computing device-implemented method comprising:
translating, by the computing device, a script command into a test case for testing a network, where the script command includes a command for creating the test case and defines an originating device and a terminating device of the network to perform the test case, and where the originating and terminating devices are distinct from the computing device and from each other;
receiving, by the computing device, an audio input, streamed from the originating device, based on the test case;
receiving, by the computing device, an audio input, recorded on the terminating device, based on the test case;
performing, by the computing device, a quality test of the received audio inputs based on the test case; and
generating, by the computing device, a result of the quality test to determine a functionality of the network.

13. The method of claim 12, further comprising:
scheduling the test case for testing the network via the originating and terminating devices.

14. The method of claim 13, where scheduling the test case for testing the network further comprises:
scheduling the originating device and the terminating device for the test case;
defining signaling protocols for the originating and terminating devices; and
specifying signaling attributes for the originating and terminating devices.

15. The method of claim 12, where translating the script command into the test case for testing the network comprises at least one of:
defining a signaling protocol for at least one of the originating device or the terminating device;
specifying a telephone number for at least one of the originating device or the terminating device; or
specifying a signaling attribute for at least one of the originating device or the terminating device.

16. The method of claim 12, where the received audio inputs are transferred across the network to preserve a quality of the received audio inputs.

17. The method of claim 12, where performing the quality test of the received audio inputs based on the test case comprises performing, on the received audio inputs, at least one of:
a perceptual speech quality measure (PSQM) calculation;
a perceptual evaluation of speech quality (PESQ) calculation;
a perceptual evaluation of audio quality (PEAQ) calculation; or
a mean opinion score (MOS) calculation.

18. The method of claim 12, where generating the result of the quality test to determine the functionality of the network comprises at least one of:
providing the quality test result to an execution server as part of an overall test result;
providing the quality test result to a client device for display; or
providing the quality test result to a database for storage.

19. A device comprising:
a script translator to translate a script command into a test case for testing a network, where the script command includes a command for creating the test case and defines an originating device and a terminating device of the network to perform the test case, and where the originating and terminating devices are distinct from the device and from each other;
a test processor to schedule the test case;
an audio monitor to:
receive an audio input, streamed from the originating device, based on the test case, and
receive an audio input, recorded on the terminating device, based on the test case; and
an audio analyzer to:
perform a quality test of the received audio inputs based on the test case, and
generate a result of the quality test to determine a functionality of the network.

20. The device of claim 19, where the script command at least one of:
defines a signaling protocol for at least one of the originating device or the terminating device;
specifies a telephone number for at least one of the originating device or the terminating device; or
specifies a signaling attribute for at least one of the originating device or the terminating device.

21. The device of claim 19, where the test processor is further to at least one of:
schedule the originating device and the terminating device for the test case;
define signaling protocols for the originating and terminating devices;
specify telephone numbers for the originating and terminating devices; or
specify signaling attributes for the originating and terminating devices.

22. The device of claim 19, where the quality test comprises at least one of:
a perceptual speech quality measure (PSQM) calculation;
a perceptual evaluation of speech quality (PESQ) calculation;
a perceptual evaluation of audio quality (PEAQ) calculation; or
a mean opinion score (MOS) calculation.

23. The device of claim 19, further comprising:
a video analyzer to:
perform a quality test of a video input based on the test case, and
generate a result of the quality test of the video input to determine a functionality of the network.

24. The device of claim 23, where the quality test comprises a perceptual evaluation of video quality (PEVQ) calculation.

* * * * *